United States Patent
Mehl

(10) Patent No.: US 9,885,864 B2
(45) Date of Patent: Feb. 6, 2018

(54) LIGHTING DEVICE AND METHOD FOR GENERATING LIGHT BY MEANS OF A WAVELENGTH CONVERSION ARRANGEMENT AND A BAND-STOP FILTER, AND METHOD FOR PROVIDING A BAND-STOP FILTER

(71) Applicant: OSRAM GmbH, Munich (DE)

(72) Inventor: Oliver Mehl, Berlin (DE)

(73) Assignee: OSRAM GmbH, Munich (DE)

(*) Notice: Subject to any disclaimer, the term of this patent is extended or adjusted under 35 U.S.C. 154(b) by 211 days.

(21) Appl. No.: 14/529,225

(22) Filed: Oct. 31, 2014

(65) Prior Publication Data
US 2015/0124430 A1     May 7, 2015

(30) Foreign Application Priority Data

Nov. 5, 2013  (DE) .................. 10 2013 222 430

(51) Int. Cl.
*G02B 26/00* (2006.01)
*F21V 9/10* (2006.01)
(Continued)

(52) U.S. Cl.
CPC .............. *G02B 26/008* (2013.01); *F21V 9/10* (2013.01); *F21Y 2115/10* (2016.08); *F21Y 2115/30* (2016.08)

(58) Field of Classification Search
CPC ......... F21V 9/10; F21S 10/007; G02B 26/008
See application file for complete search history.

(56) References Cited

U.S. PATENT DOCUMENTS 7,854,514 B2 * 12/2010 Conner ................ G02B 27/283
                                                    353/121
7,859,754 B2   12/2010 Falicoff
(Continued)

FOREIGN PATENT DOCUMENTS

CN        1932370        3/2007
CN      102385233 A      3/2012
CN      102918668 A      2/2013

OTHER PUBLICATIONS

Office Action based on application No. 201410617521.1 (7 pages and 9 pages of English translation) dated Jul. 3, 2017 (reference Purpose Only).

*Primary Examiner* — Anabel Ton
(74) *Attorney, Agent, or Firm* — Viering, Jentschura & Partner mbB

(57) ABSTRACT

The invention proposes a lighting device (1) comprising a wavelength conversion arrangement (12) and a static band-stop filter (14). The wavelength conversion arrangement (12) comprises two wavelength conversion elements, which can be excited to emit conversion light by means of excitation radiation emitted by an excitation source (2). In order to increase the color space which is addressable by means of the two wavelength conversion elements, with the aid of the band-stop filter (14) the shorter dominant wavelength of the conversion light of both wavelength conversion elements is shortened and the longer dominant wavelength is lengthened. For this purpose, the peak wavelength of the band-stop filter (14) is chosen such that it lies between the two dominant wavelengths of the conversion light emitted by the two wavelength conversion elements. The use of a static band-stop filter (14) designed in this way makes it possible to dispense with separate filter elements for each wavelength conversion element. If the wavelength conversion arrangement is designed as a phosphor wheel (12), in particular a (Continued)

separate filter wheel to be synchronized with the phosphor wheel can be dispensed with.

20 Claims, 13 Drawing Sheets

(51) Int. Cl.
*F21Y 115/30* (2016.01)
*F21Y 115/10* (2016.01)

(56) References Cited

U.S. PATENT DOCUMENTS

| | | |
|---|---|---|
| 8,047,658 B2 | 11/2011 | Yang |
| 8,545,029 B2 | 10/2013 | Ma et al. |
| 2007/0057626 A1 | 3/2007 | Kurihara et al. |
| 2009/0116114 A1 | 5/2009 | Falicoff |
| 2010/0156958 A1 | 6/2010 | Yang |
| 2012/0242912 A1 | 9/2012 | Kitano |
| 2012/0274908 A1 | 11/2012 | Ma et al. |
| 2013/0062637 A1 | 3/2013 | Reed et al. |
| 2013/0082289 A1 | 4/2013 | Sakuta et al. |
| 2013/0271954 A1* | 10/2013 | Li ................ H04N 9/3114 362/84 |
| 2014/0176914 A1* | 6/2014 | Mueller ............ F21S 10/007 353/31 |

* cited by examiner

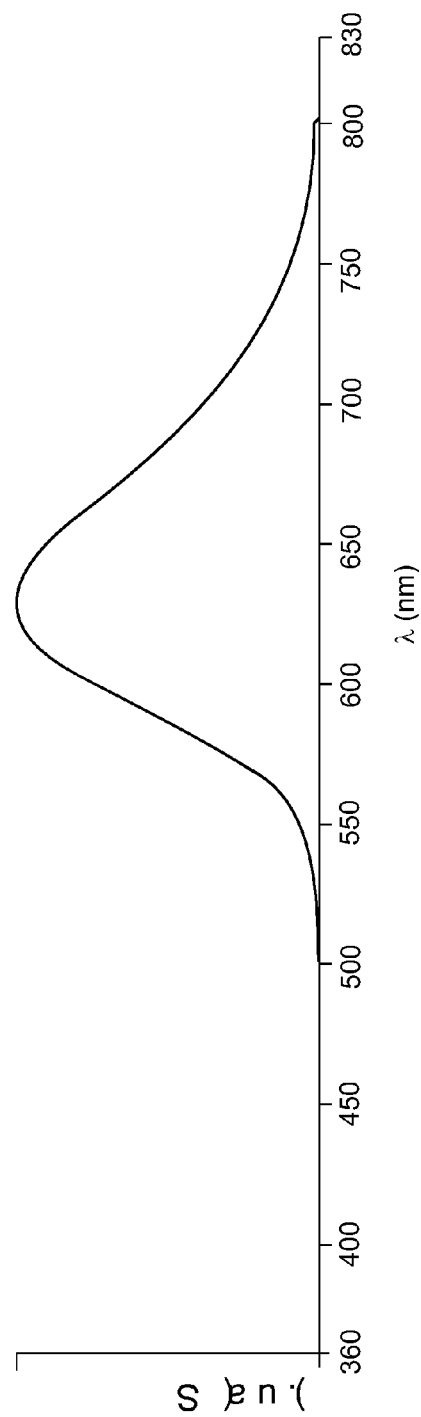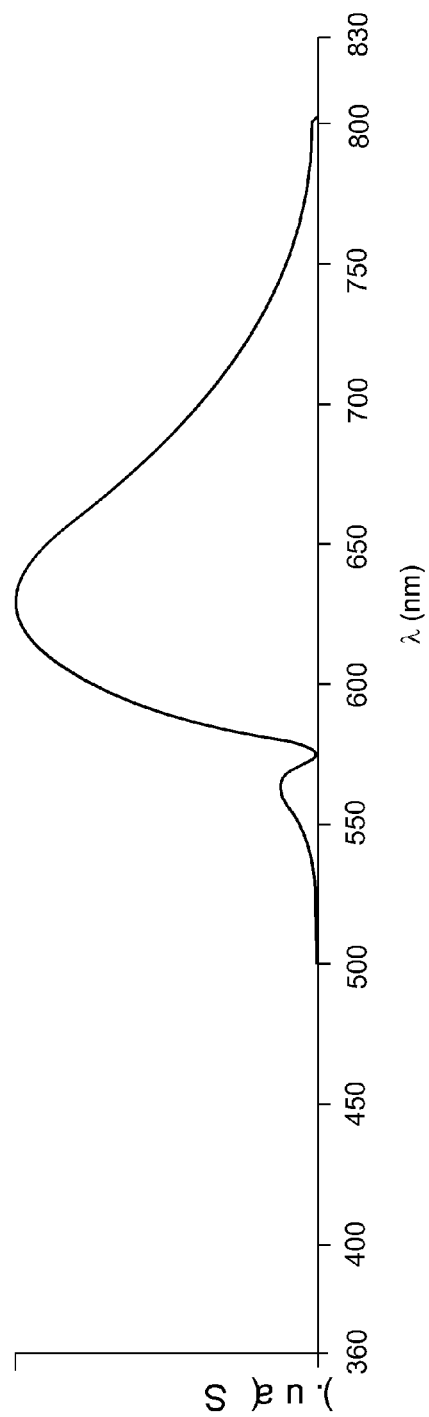

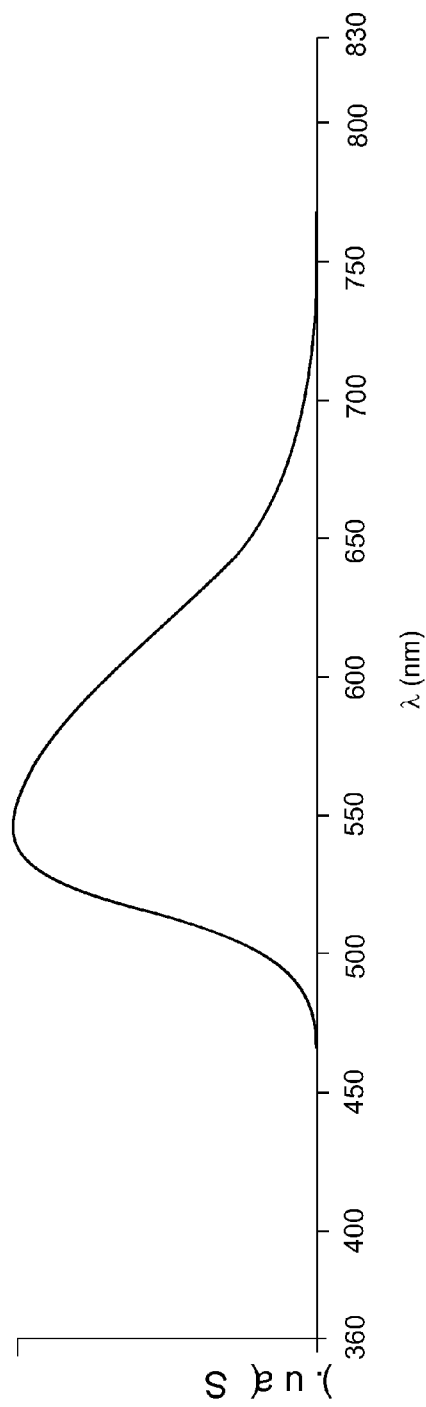
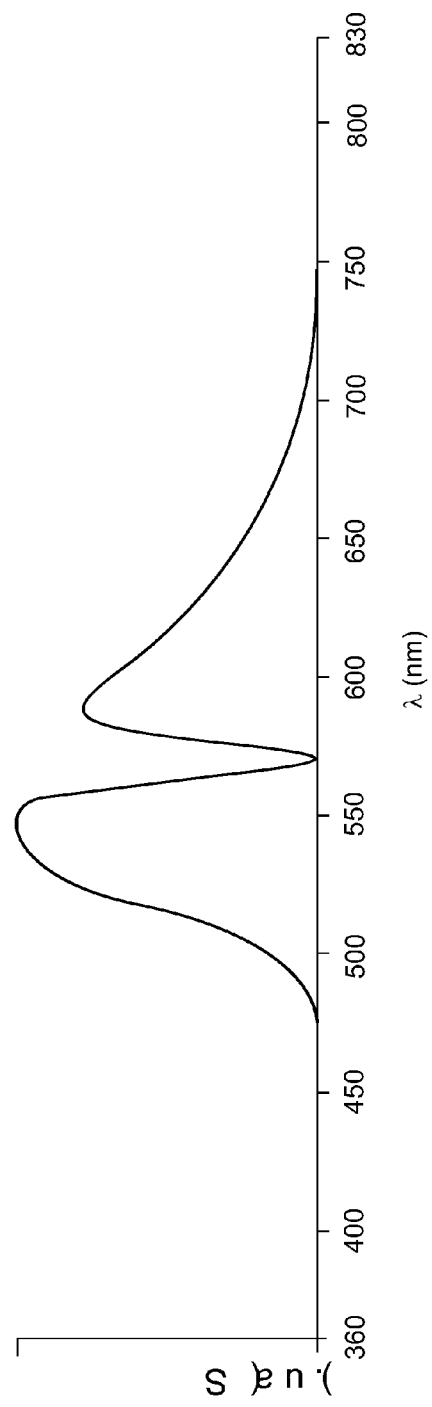
FIG 13A
FIG 13B

LIGHTING DEVICE AND METHOD FOR GENERATING LIGHT BY MEANS OF A WAVELENGTH CONVERSION ARRANGEMENT AND A BAND-STOP FILTER, AND METHOD FOR PROVIDING A BAND-STOP FILTER

CROSS-REFERENCE TO RELATED APPLICATION

This application claims priority to German Patent Application Serial No. 10 2013 222 430.3 which was filed Nov. 5, 2013, and is incorporated herein by reference in its entirety.

The invention is based on a lighting device comprising an excitation radiation source and a wavelength conversion arrangement.

Furthermore, the invention relates to a method for generating light by means of a wavelength conversion arrangement and to a method for providing a band-stop filter for the lighting device according to the invention.

The invention can be used, in particular, for projection devices, for example for film and video projection, in technical and medical endoscopy, for lighting effects in the entertainment industry, for medical irradiations and in the vehicle sector, for example for headlights for motor vehicles.

BACKGROUND OF THE INVENTION

The document US 2009/0116114 A1 discloses dichroic filters for merging blue light from a light-emitting diode (LED) and the yellow light from a phosphor to form white mixed light. In this case, the blue light from the LED is transmitted and the yellow light from the phosphor is reflected.

The document US 2010/0156958 A1 discloses in FIG. 8 a projection system 800 comprising a lighting device for illuminating the two image generating units 820, 822. The lighting device comprises a lamp 802, in particular a high-pressure lamp, the white light from which is filtered sequentially into colored light portions with the aid of a rotating color filter wheel 806. A yellow notch filter 818 disposed downstream of the color filter wheel 806 filters the yellow light portion from the previously filtered colored light portions in order thus to improve the color space.

The document US 2012/0274908 A1 discloses a lighting device for a projector. The lighting device comprises a high-pressure mercury vapor lamp and at least in each case one laser that emits red light and one laser that emits green light. The red light laser is intended to compensate for the excessively small red light portion of high-pressure mercury vapor lamps. A yellow notch filter serves for suppressing the yellow light portion, which is very high in the case of high-pressure mercury vapor lamps, and thus for setting a white point that is correct for the projection.

The document US 2013/062637 A1 discloses a semiconductor light source comprising a phosphor layer, in particular an LED in a housing comprising a phosphor layer. A double notch filter layer transmits desired wavelengths, such as green and red, and reflects others, such as yellow and blue, for example, back to the phosphor.

What is disadvantageous about currently available phosphors is that the size of the addressable color space is smaller than desired. These phosphors are not well suited to many projection applications, e.g. home cinema, simulation. A color space is sought which corresponds approximately to Rec. 709 for the green and red color channels (sRGB color space). For this, the so-called dominant wavelength of green phosphors, that is to say in the green spectral range, is usually too long and the dominant wavelength at least of efficient red phosphors, that is to say in the red spectral range, is too short. Red phosphors having a suitable dominant wavelength generally have a relatively low conversion efficiency. The dominant wavelength of light having a light color (colored light) is defined in the CIE chromaticity diagram (standard chromaticity diagram) by the point of intersection between the straight line, extended from the white point via the determined color locus of the colored light, and the spectrum locus of the closest edge of the CIE chromaticity diagram.

The document CN 102385233 A discloses a lighting device for a projector comprising a pump laser, a phosphor wheel for the wavelength conversion of the pump laser light into conversion light, and a filter wheel, for spectrally filtering the conversion light. The filter wheel and the phosphor wheel are arranged on a common axis and thus rotate at the same speed. The pump laser light is reflected onto the phosphor wheel with the aid of a dichroic mirror. By contrast, the conversion light reflected back from the phosphor wheel passes through the dichroic mirror and then impinges on the filter wheel. Through a transparency segment in the phosphor wheel, the pump laser light can pass through the phosphor wheel in a spectrally unchanged manner and is fed to the dichroic mirror via a so-called wrap around loop and is combined with the conversion light path.

The use of an additional filter wheel upstream of the integrator within a DLP projector causes additional costs, additional space requirement and possibly additional complexity in the driving of the filter wheel and the synchronization with the phosphor wheel.

SUMMARY OF THE INVENTION

The object of the present invention is to specify a lighting device having an addressable color space large enough for projection applications, in particular, and at the same time largely to avoid the disadvantages of the prior art.

This object is achieved by means of a lighting device for generating light by means of a wavelength conversion arrangement, comprising an excitation radiation source, which is designed to emit excitation radiation, and a wavelength conversion arrangement, which comprises at least one first wavelength conversion element and one second wavelength conversion element, which wavelength conversion arrangement is arranged in such a way that excitation radiation emitted by the excitation radiation source can be radiated at least indirectly onto the first wavelength conversion element and onto the second wavelength conversion element, wherein the first wavelength conversion element is designed to convert excitation radiation into light having a first spectrum and a first dominant wavelength, and wherein the second wavelength conversion element is designed to convert excitation radiation into light having a second spectrum and a second dominant wavelength, wherein the second dominant wavelength ($\lambda_{D2}$) is longer than the first dominant wavelength ($\lambda_{D1}$), characterized in that the lighting device furthermore comprises at least one band-stop filter arranged in such a way that light emitted by the first wavelength conversion element and the second wavelength conversion element can be radiated at least partly and at least indirectly onto the band-stop filter, wherein the band-stop filter is designed to filter the conversion light emitted by the wavelength conversion elements and radiated onto the band-stop filter in such a way that the first dominant wavelength is shortened and the second dominant wavelength is lengthened.

Particularly advantageous configurations are found in the dependent claims.

Moreover, the object with regard to its aspects for generating light is achieved by means of a method comprising the features of the independent method claim directed thereto. Finally, the object with regard to its aspects for providing a band-stop filter is achieved by means of a method comprising the features of the independent method claim directed thereto.

The features described below for the lighting device according to the invention and the possibilities for configuration thereof and the advantages of said features also hold true, insofar as applicable, in an analogous manner for the method according to the invention for generating light and for providing a band-stop filter, and vice versa.

The basic concept of the present invention consists in increasing the color space which is addressable with the aid of a wavelength conversion arrangement with the aid of a static filter, in which, from two color channels realized by means of phosphor conversion, the shorter dominant wavelength is shortened and the longer dominant wavelength is lengthened. For this purpose, an optical band-stop filter, also called band-rejection filter or notch filter, is provided according to the invention.

A band-stop filter has at least one "stop band" with a high degree of attenuation, ideally with vanishingly low transmission, and high, ideally 100%, transmission on both sides of the stop band. The blocking effect can be realized by means of absorption or reflection. A band-stop filter is usually characterized by a peak wavelength (also called center wavelength) lying in the center of the stop band. The filter width is usually defined as the wavelength range in which, on both sides of the center wavelength, the transmission falls to 50% of the maximum transmission (FWHM=Full Width at Half Maximum). Band-stop filters typically have a filter width of 10 nm to a few 10 nm.

According to the invention the peak wavelength of the band-stop filter is chosen such that it lies between the dominant wavelengths of the two color channels, wherein the two color channels are formed by two suitable wavelength conversion elements.

In one preferred embodiment, one of the two wavelength conversion elements is designed in such a way that its dominant wavelength is in a green or at least yellow-green spectral range. This wavelength conversion element therefore comprises a green or green-yellow phosphor. The other wavelength conversion element is preferably designed in such a way that its dominant wavelength is in a red or yellow-red spectral range. This wavelength conversion element therefore comprises a red or yellow-red phosphor. In this case, the band-stop filter is designed in such a way that it blocks a yellow spectral range. The peak wavelength of the band-stop filter is therefore preferably in the range of between 555 and 605 nm, in particular between 565 and 585 nm. The filter width (FWHM) is preferably in the range of between 5 and 25 nm, in particular between 10 and 20 nm.

The band-stop filter according to the invention can be realized, in a customary manner, by means of a suitable layer design or else as a rugate filter, that is to say by means of continuous modulation of the refractive index.

At least during the filtering, the band-stop filter is arranged statically in the light path of the light converted by the wavelength conversion elements. It can therefore be arranged for example on a rigid carrier or else applied on a surface of one of the other optical elements, for example a beam shaping lens. Nevertheless, the band-stop filter can, however, also be pivotable into the light path for filtering. Likewise, two or more different band-stop filters can be arranged on a rotatable device in such a way that optionally one of the two or more band-stop filters can be rotated into the light path. In this way, the filter effect can be adapted to different requirements, for example during the operation of the device.

The wavelength conversion arrangement is preferably designed as a phosphor wheel, which is rotatable about a rotation axis of the phosphor wheel. The first wavelength conversion element is arranged at least in a segment of a ring-shaped region of the phosphor wheel running around the rotation axis of the phosphor wheel. The second wavelength conversion element is arranged at least in a second segment of a region running in a ring-shaped fashion around the rotation axis of the phosphor wheel.

Furthermore, one or a plurality of further wavelength conversion elements can also be arranged on the phosphor wheel. The or one further wavelength conversion element can comprise for example a yellow phosphor, i.e. a phosphor having a dominant wavelength in the yellow spectral range, or else some other phosphor.

Moreover, the phosphor wheel can have a region that is transmissive to the excitation radiation in at least one third or further segment of a region running in a ring-shaped fashion around the rotation axis.

The abovementioned regions running in a ring-shaped fashion around the rotation axis can be identical for the individual segments, i.e. all segments are arranged on one and the same region running in a ring-shaped fashion around the rotation axis. Alternatively, at least one further segment can be arranged on an additional region running in a ring-shaped fashion around the rotation axis, wherein the regions running in a ring-shaped fashion around the rotation axis are arranged concentrically with respect to one another.

In this case, the lighting device is configured in such a way that excitation radiation emitted by the excitation radiation source, at least indirectly, during a rotation of the phosphor wheel, can be radiated sequentially onto each segment of the region or regions of the phosphor wheel running in a ring-shaped fashion around the rotation axis.

The excitation radiation transmitted through the transmissive region can be guided back via deflection mirrors onto a dichroic mirror arranged in the light path of the light converted by the wavelength conversion elements and can be combined with the converted light. For further details in this regard, reference is made to the exemplary embodiment.

The static band-stop filter can be arranged upstream or downstream of the dichroic mirror. In any case, it is arranged downstream of the phosphor wheel in the light path of the rotating wavelength conversion elements. It thus acts, in accordance with its filter characteristic, temporally sequentially on the conversion light of all the wavelength conversion elements.

The method according to the invention for generating light by means of a wavelength conversion arrangement, which comprises at least two wavelength conversion elements, comprises the following method steps:

providing a first wavelength conversion element, which, upon absorbing excitation radiation, converts the latter into light having a first spectrum and a first dominant wavelength ($\lambda_{D1}$), providing a second wavelength conversion element, which, upon absorbing excitation radiation, converts the latter into light having a second spectrum and a second dominant wavelength ($\lambda_{D2}$), wherein the first dominant wavelength ($\lambda_{D1}$) is shorter than the second dominant wavelength ($\lambda_{D2}$), radiating excitation radiation onto the first wavelength conversion element, radiating excitation radiation onto the second wavelength conversion element, providing a static band-stop filter, which filters the light converted by the wavelength conversion elements in such a way that the first dominant wavelength ($\lambda_{D1}$) is shortened and the second dominant wavelength ($\lambda_{D2}$) is lengthened.

The wavelength conversion with the aid of the first wavelength conversion element and the second wavelength conversion element can be effected in particular temporally sequentially, for example by virtue of the wavelength conversion elements being arranged on a rotatable phosphor wheel.

In a further method step, the light converted with the aid of the first wavelength conversion element can be combined and mixed with the light converted with the aid of the second wavelength conversion element. The light mixing can be carried out before or else after the filtering and results, if appropriate when considered temporally sequentially, in mixed light.

Providing the band-stop filter according to the invention comprises the following method step:

selecting the peak wavelength and the filter width (FWHM) of the band-stop filter in such a way that the band-stop filter reduces the dominant wavelength of the light having the first spectrum and increases the dominant wavelength of the light having the second spectrum.

In particular, the peak wavelength of the band-stop filter is chosen such that it lies between the first and second dominant wavelengths of the respective unfiltered wavelength-converted light having the first spectrum and second spectrum.

Depending on the application, it can be advantageous, when selecting the suitable peak wavelength and filter width of the band-stop filter, to take account of the fact that the band-stop filter reduces the total luminous flux of the wavelength-converted light having the first spectrum and of the wavelength-converted light having the second spectrum to not less than 75%, in particular not less than 80%.

Depending on the application, it can also be advantageous, when selecting the suitable peak wavelength and filter width of the band-stop filter, to take account of the fact that the correlated color temperature (CCT) of the mixed light, which is mixed from the wavelength-converted light having the first spectrum and the wavelength-converted light having the second spectrum and, if appropriate, one or more further colored light portions, is increased in relation to the unfiltered mixed light.

The specific values for the peak wavelength and the filter width of the band-stop filter that are to be preferred for the respective application depend, inter alia, on the phosphors used and can be determined by some orienting measurements, for instance as shown below on the basis of the measured values in FIGS. 6 to 12.

Further advantages, features and details of the invention are evident from the claims, the following description of preferred embodiments and with reference to the drawings.

BRIEF DESCRIPTION OF THE DRAWINGS

The invention will be explained in greater detail below on the basis of exemplary embodiments. In the figures:

FIGS. 13A, 13B show the influence of the yellow band-stop filter on the emission spectrum of a yellow phosphor.

DESCRIPTION

Features that are identical or of identical type may also be designated by identical reference signs hereinafter, for the sake of simplicity.

Figure 1:
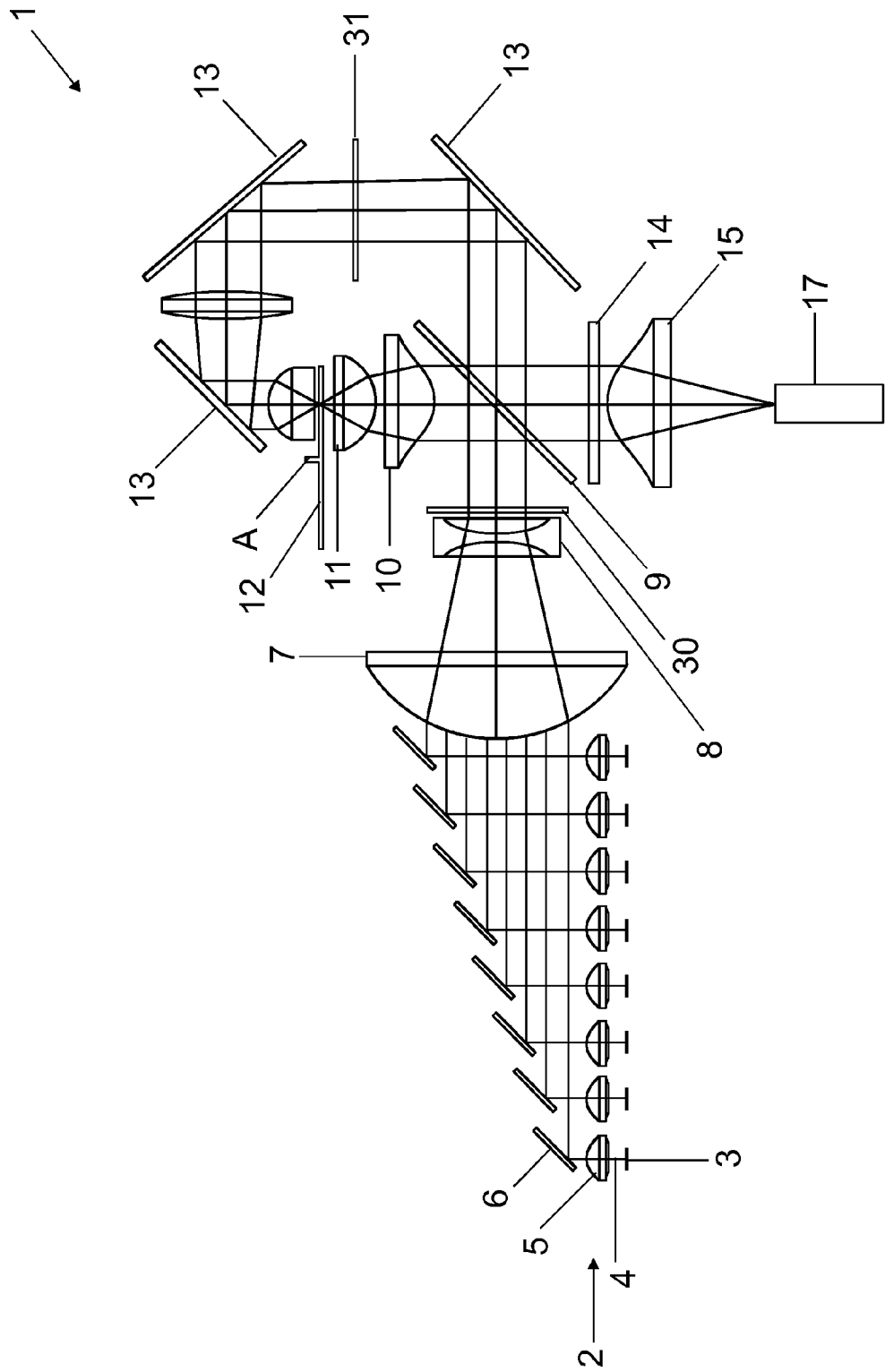
FIG. 1 shows one exemplary embodiment of a lighting device according to the invention comprising a yellow band-stop filter.

FIG. 1 shows a schematic illustration of a lighting device 1 in accordance with one exemplary embodiment of the invention. The lighting device 1 in this case comprises an excitation radiation source 2 embodied as a laser diode array and comprising a plurality of laser diodes 3. The respective laser wavelength thereof can be designed to be identical or different, in principle, depending on the requirement. Other radiation sources would also be conceivable, such as, for example, those comprising LASERs, superluminescence diodes, LEDs, organic LEDs and the like. The excitation radiation source 2 is designed to emit excitation radiation 4 in the blue or ultraviolet spectral range, preferably in the range of 440-470 nm, particularly preferably at approximately 450 nm, since this constitutes a suitable excitation wavelength for most phosphors and, moreover, can also be utilized as a blue color channel. Via optical elements 5-11, the light from said laser diodes 4 is directed onto a wavelength conversion arrangement, which is designed as a phosphor wheel 12. The two optical elements 7 and 8 form a reducing telescope. Furthermore, a diffuser 30 is arranged in the beam path of the optical elements 5-11 in order to generate an expanded intensity profile on the phosphors of the phosphor wheel 12 by diffusing the excitation radiation 4.

Figure 2:
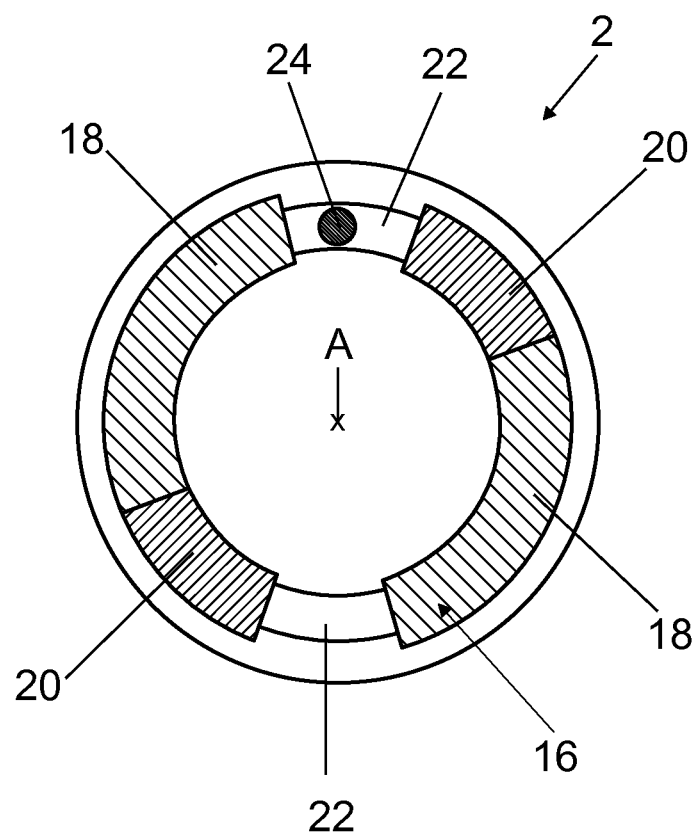
FIG. 2 shows the phosphor wheel used in the lighting device in accordance with FIG. 1.

For the more detailed explanation of the construction of the phosphor wheel 12, reference will now also be made to FIG. 2. In this case, the phosphor wheel 12 designed for the reflection mode is embodied as rotatable about the rotation axis A and has a segmented region 16 running in a ring-shaped fashion around the rotation axis A. In this context, a wavelength conversion element embodied as a green phosphor 18 is arranged in each case in two segments of said region 16 and a wavelength conversion element embodied as a red phosphor 20 is arranged in two further segments of said region 16. Two more segments of the ring-shaped region 16 have no phosphor, but rather are embodied with a through-opening 22. In this case, the circle 24 illustrated in the upper through-opening is intended to schematically illustrate the excitation radiation 4 from the excitation radiation source 2 (cf. FIG. 1), said excitation radiation being focused onto the phosphor wheel 12. As a result of the rotation of the phosphor wheel 12, each segment of the ring-shaped region can thus be irradiated sequentially with the excitation radiation 2. As a result of the excitation of the green phosphor 18 by means of the excitation radiation 4, the green phosphor 18 emits light having an emission spectrum which has, in particular, a dominant wavelength $\lambda_{DG}$ in the green spectral range. Likewise, upon excitation by the excitation radiation 4, the red phosphor 20 emits light having an emission spectrum which has a dominant wavelength $\lambda_{DR}$ in the red spectral range. The segment sizes of the phosphor wheel 12 can be configured depending on the desired luminous flux in the individual color channels or the desired luminous flux ratios of the different-colored luminous fluxes with respect to one another depending on the application.

The light converted and emitted by the phosphor wheel 12 is collected and collimated by two lenses 11, 10 and then passes through a dichroic mirror 9 designed to reflect light in the blue spectral range and to transmit light in the non-blue spectral range, i.e. light having longer wavelengths. As a result of this design, the dichroic mirror serves for combining the light converted and emitted by the phosphor wheel 12 with the excitation radiation 4 transmitted through the through-openings 22 of the phosphor wheel 12. Three deflection mirrors 13 are provided for deflecting the transmitted excitation radiation 4, said deflection mirrors being arranged in the beam path in each case at an angle of 45° with respect to the incident excitation radiation 4 ("wrap around" path of the excitation radiation). A further diffuser 31 is also arranged in this wrap around path.

The light and excitation radiation combined by means of the dichroic mirror 9 is filtered with the aid of an optical notch filter 14 (for example from Thorlabs) and passes via a focusing lens 15 into an optical integrator 17. The notch filter 14 has a peak wavelength of 575 nm and a filter width (FWHM) of 15 nm.

Figure 3:
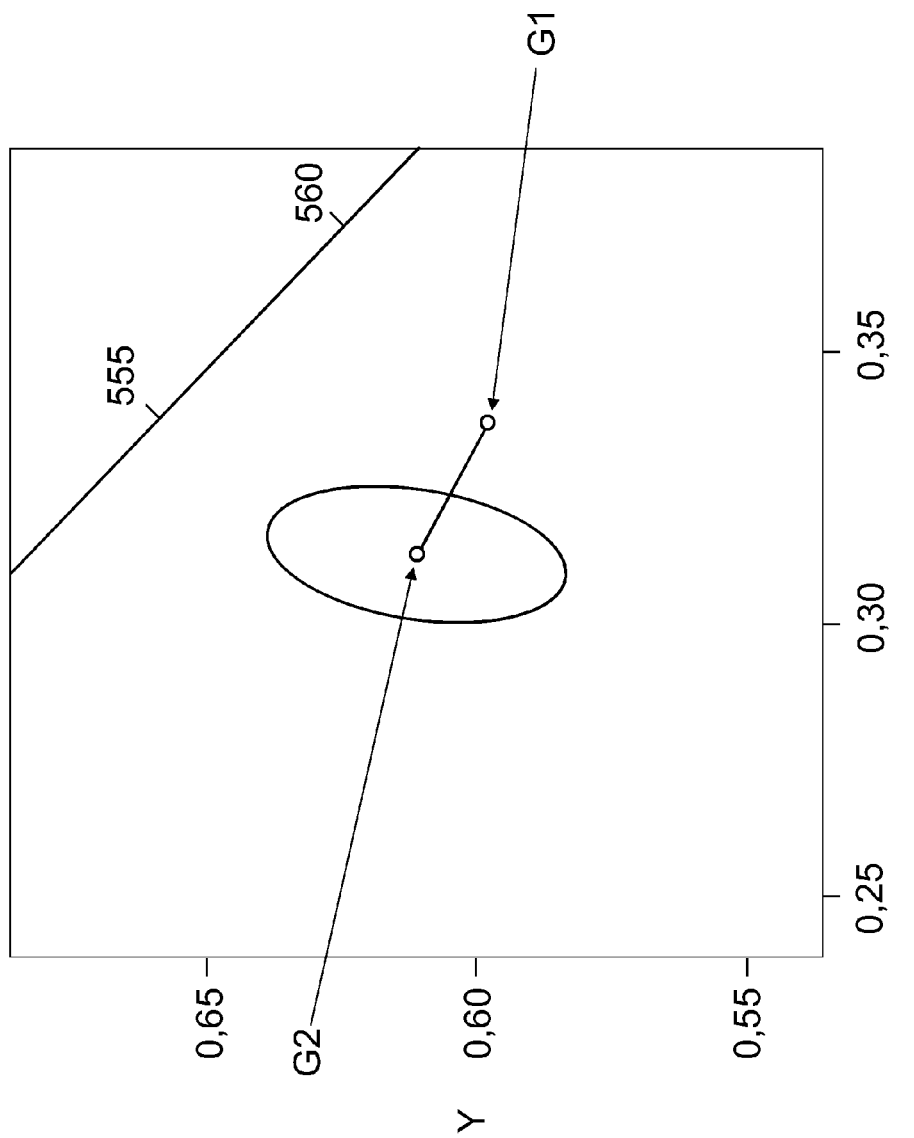
FIG. 3 shows the influence of the yellow band-stop filter on the color locus of the green color channel of the lighting device in accordance with FIG. 1.

FIG. 3 shows the influence of the notch filter 14 on the green color channel G, i.e. on the green light converted and emitted by the green phosphor 18, on the basis of an excerpt from the CIE standard chromaticity diagram. A cerium-doped garnet phosphor is involved here. The shift of the original color locus G1 without filtering in the desired direction to the color locus G2 with filtering is clearly discernible.

Figure 4:
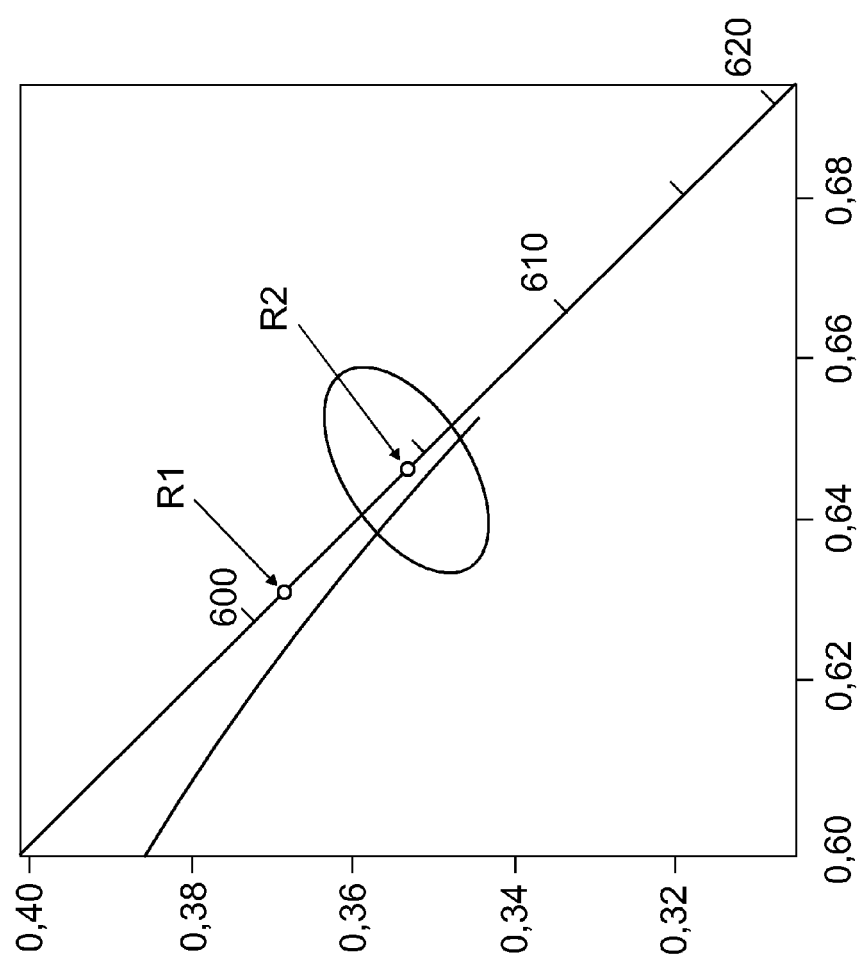
FIG. 4 shows the influence of the yellow band-stop filter on the color locus of the red color channel of the lighting device in accordance with FIG. 1, FIGS. 5A, 5B show the influence of the yellow band-stop filter on the emission spectrum of the red phosphor of the phosphor wheel.

FIG. 4 shows the corresponding influence of the notch filter 14 on the red color channel R, i.e. on the red light converted and emitted by the red phosphor 20. A europium-doped nitridic phosphor is involved here. The shift of the original color locus R1 without filtering in the direction of a longer wavelength with filtering to the color locus R2 is clearly discernible. As a result of the filtering the dominant wavelength $\lambda_D$ of the red color channel is lengthened from 600.8 nm (unfiltered) to 604.5 nm. In return, the luminous flux of the red color channel decreases as a result of the filtering to an acceptable 86% (unfiltered=100%). FIG. 5A shows the unfiltered and FIG. 5B shows the filtered emission spectrum of the red phosphor 20 in schematic illustrations. The Y-axis corresponds to the spectral power density in arbitrary units. The wavelength in nanometers (nm) is plotted on the X-axis.

Figure 6:
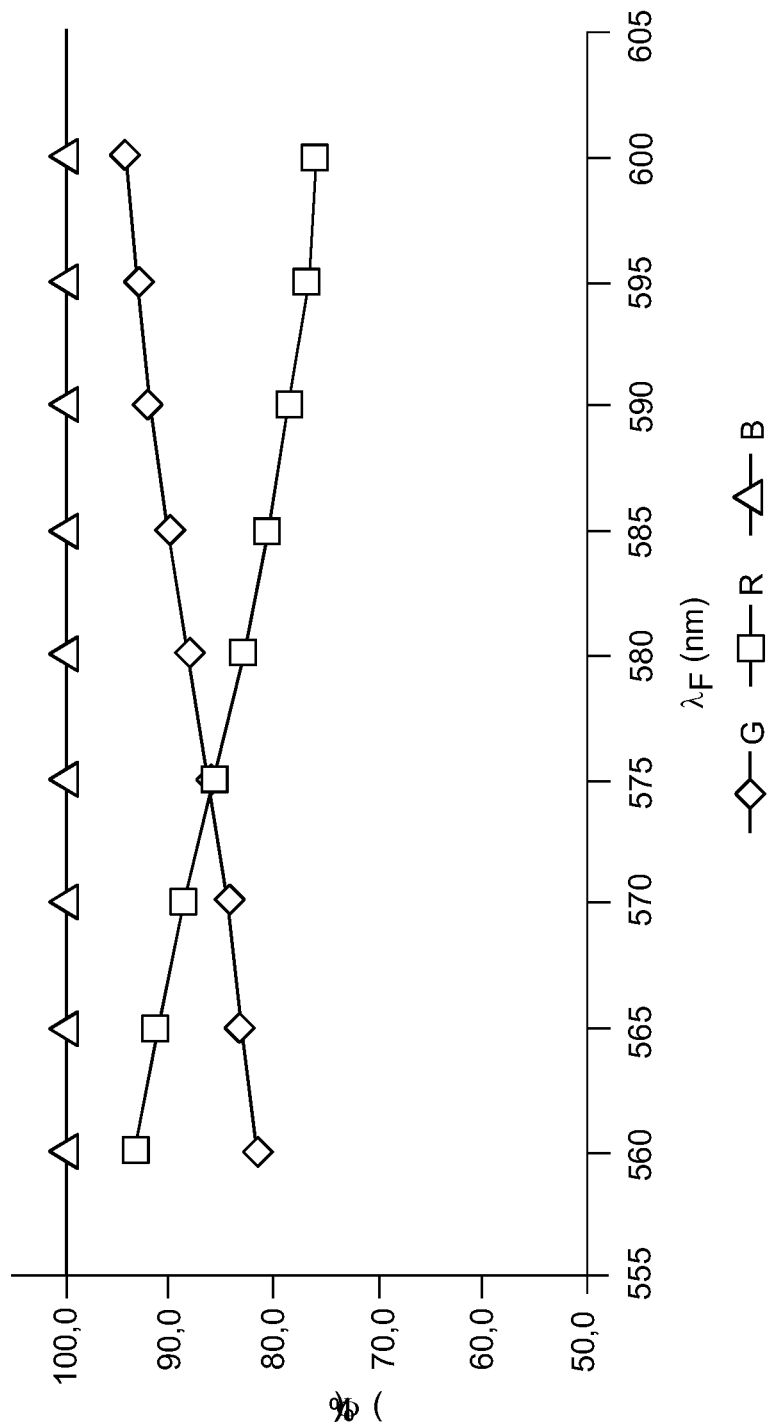
FIG. 6 shows the influence of the peak wavelength of a band-stop filter on the respective luminous flux of the individual color channels.

FIG. 6 shows the influence of the peak wavelength $\lambda_F$ (X-axis) of a notch filter on the respective luminous flux ($\Phi$) of the individual color channels. The filter width is constant here at 15 nm (FWHM). The luminous flux of the blue color channel B, which is formed by the excitation radiation 4, i.e. the blue laser radiation, is not influenced in the illustrated range of the varied peak wavelength of between 550 nm and 605 nm and is therefore fixed at 100%. In the range under consideration, the luminous flux of the red color channel R decreases as the peak wavelength $\lambda_F$ of the notch filter increases. The situation is exactly the opposite with the luminous flux of the green color channel G. At a peak wavelength of approximately 575 nm, the luminous fluxes of the red and green color channels are approximately equal, namely in each case approximately 85%.

Figure 7:
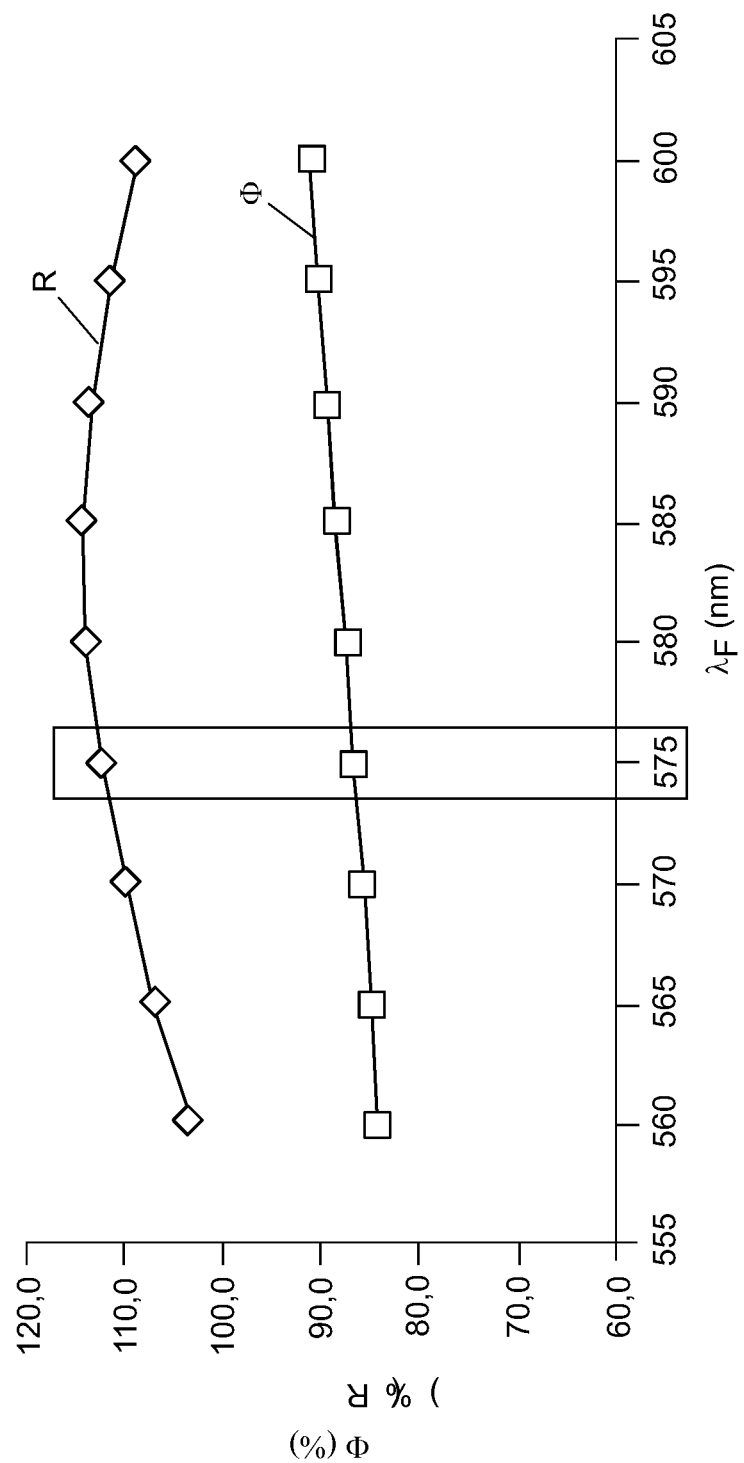
FIG. 7 shows the influence of the peak wavelength of a band-stop filter on the total luminous flux.

FIG. 7 shows the influence of the peak wavelength $\lambda_F$ (X-axis) of a notch filter (15 nm FWHM) on the total luminous flux ($\Phi$) and on the size of the color space R that is addressable by means of the colored light portions. The corresponding values are marked for the notch filter 14 used in FIG. 1 with a peak wavelength of 575 nm, in the case of which the luminous fluxes of the red and green color channels are approximately equal in magnitude, as already mentioned in the description concerning FIG. 6. An increase in the color space by approximately 12.6% and an acceptable total luminous flux of approximately 87% thus result— as desired.

Figure 8:
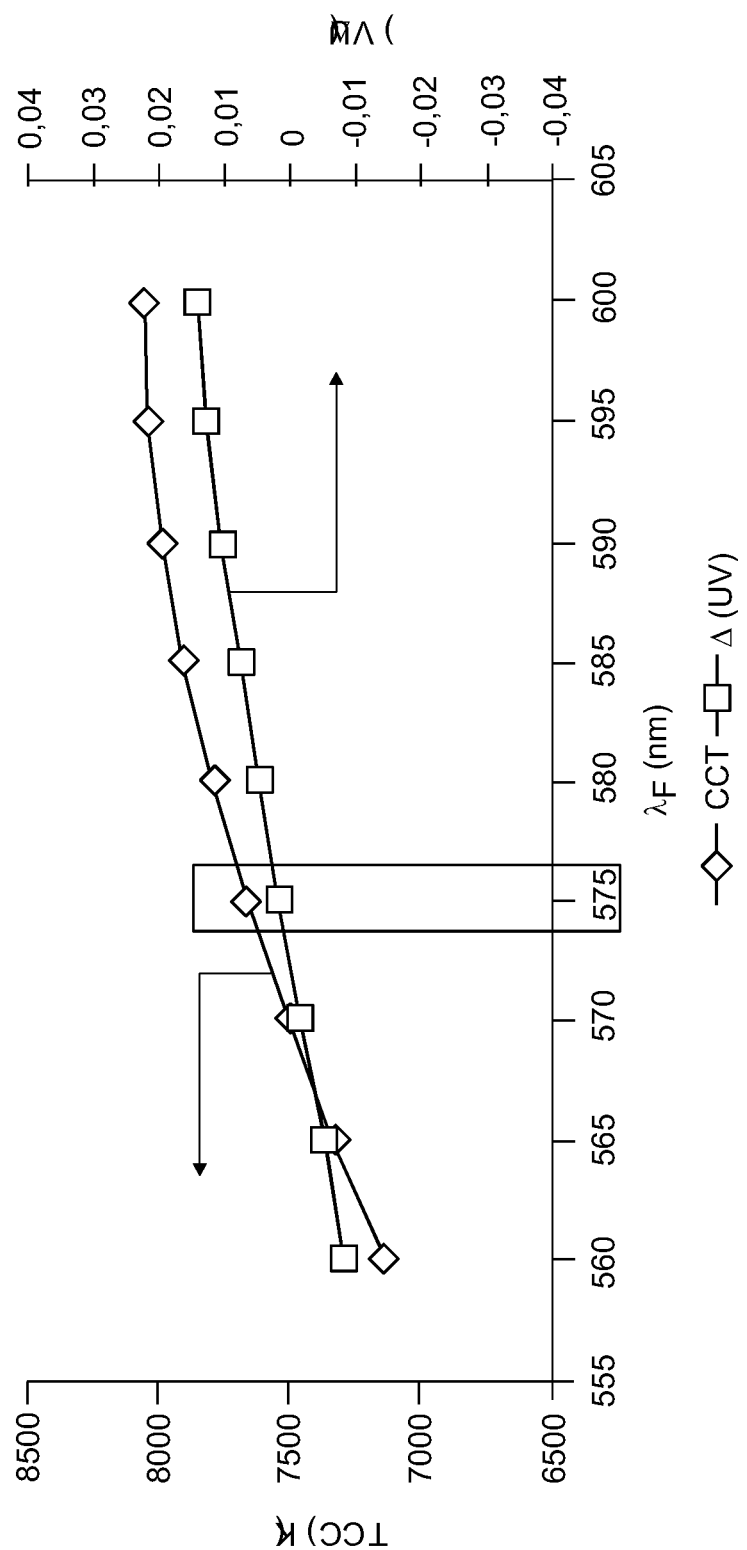
FIG. 8 shows the influence of the peak wavelength of a band-stop filter on the color temperature and the deviation from the Planckian locus.

FIG. 8 shows the influence of the peak wavelength $\lambda_F$ (X-axis) of a notch filter (15 nm FWHM) on the color temperature CCT and the deviation from the Planckian locus in $\Delta(uv)$ of the CIExy 1976 standard chromaticity diagram. Once again the corresponding values are marked with the use of the notch filter 14 used in FIG. 1 with a peak wavelength of 575 nm. An increase in the color temperature from 6500 K to 7660 K and a deviation from the Planckian locus of $\Delta(uv)$=0.0018 (unfiltered 0.0029) thus result. $\Delta(uv)$ denotes the geometrical distance between the color locus determined and the Planckian locus with the same correlated color temperature, that is to say the length of the isotherms between the white point and the Planckian locus.

Figure 9:
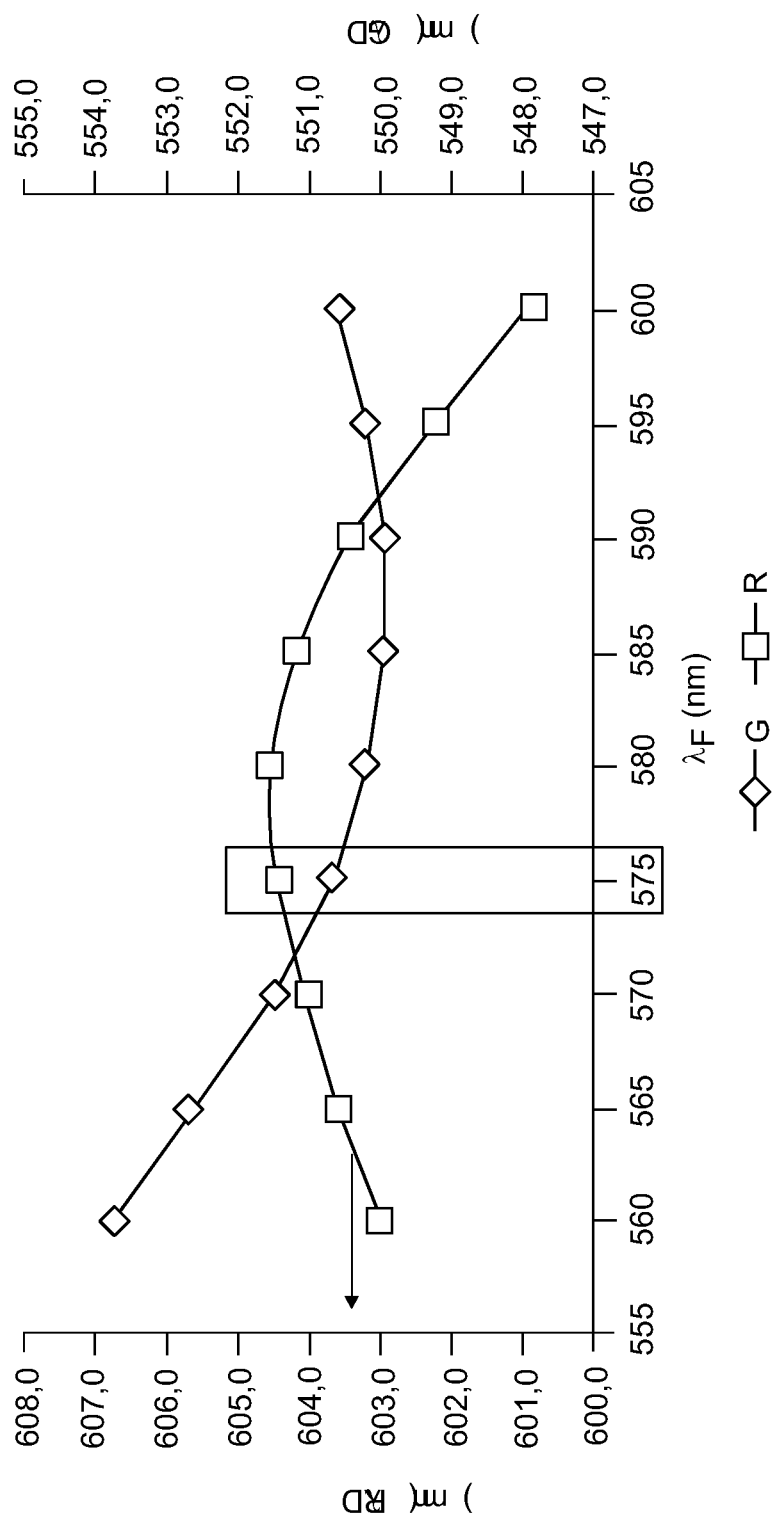
FIG. 9 shows the influence of the peak wavelength of a band-stop filter on the dominant wavelength of the green color channel and red color channel.

FIG. 9 shows the influence of the peak wavelength $\lambda_F$ (X-axis) of a notch filter (15 nm FWHM) on the dominant wavelength $\lambda_{DG}$ of the green color channel (right-hand Y-axis) and the dominant wavelength $\lambda_{DR}$ of the red color channel (left-hand Y-axis). Here too, once again the corresponding values are marked for the notch filter 14 used in FIG. 1 with a peak wavelength of 575 nm. A reduction of the dominant wavelength $\lambda_{DG}$ in the green color channel to 550.7 nm (from 555.1 nm unfiltered) and an increase in the dominant wavelength $\lambda_{DR}$ in the red color channel to 604.5 nm (from 600.8 nm unfiltered), thus result—as sought.

Figure 10:
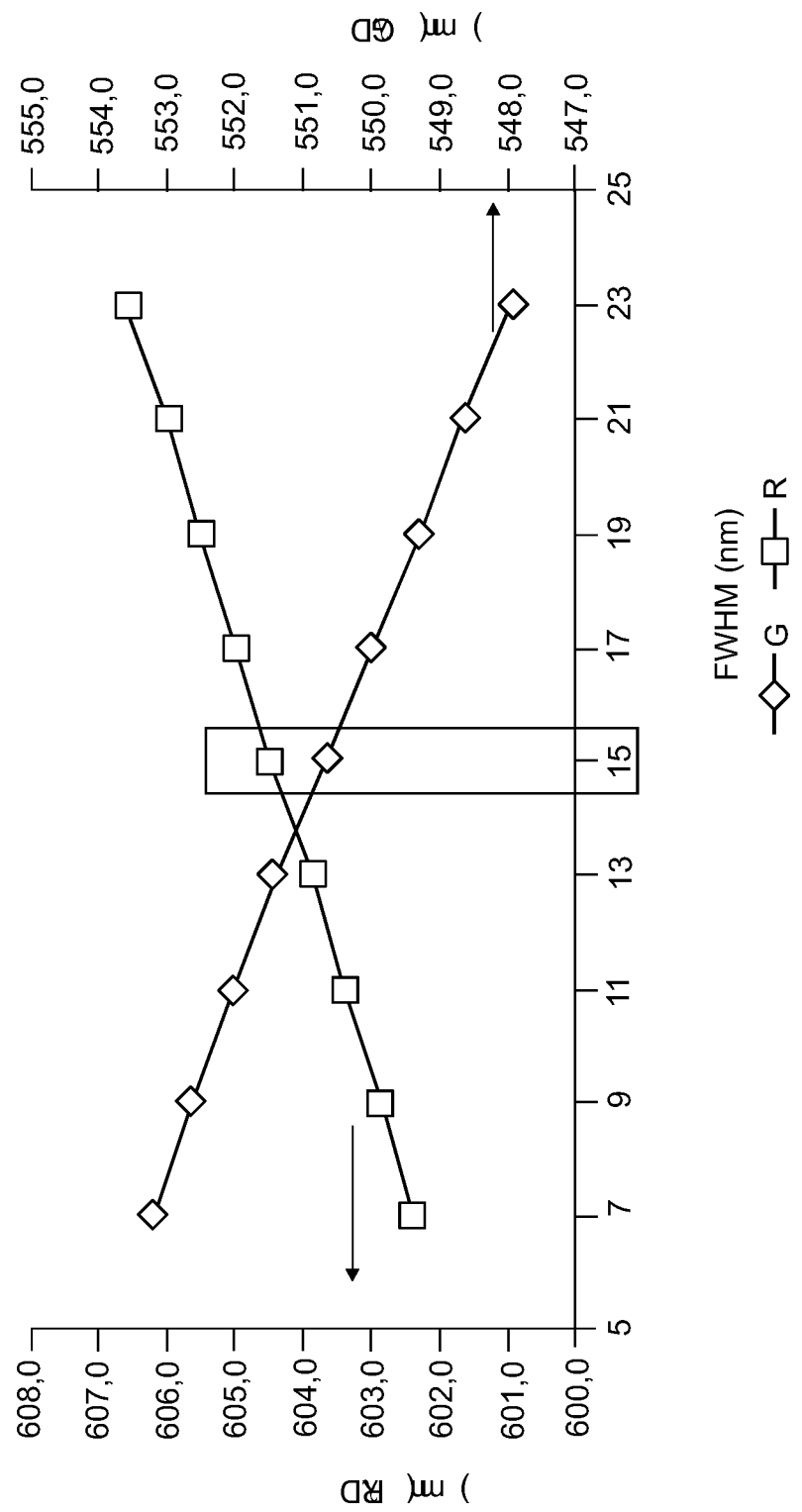
FIG. 10 shows the influence of the filter width of a band-stop filter on the dominant wavelength of the green color channel and red color channel.

FIG. 10 shows the influence of the filter width FWHM (X-axis) of a notch filter (peak wavelength $\lambda_F$=575 nm) on the dominant wavelength $\lambda_{DG}$ of the green color channel (right-hand Y-axis) and the dominant wavelength $\lambda_{DR}$ of the red color channel (left-hand Y-axis). The corresponding values with the use of the notch filter 14 used in FIG. 1 with a filter width of 15 nm (marked) correspond in this respect to the values already indicated in the description of FIG. 9.

Figure 11:
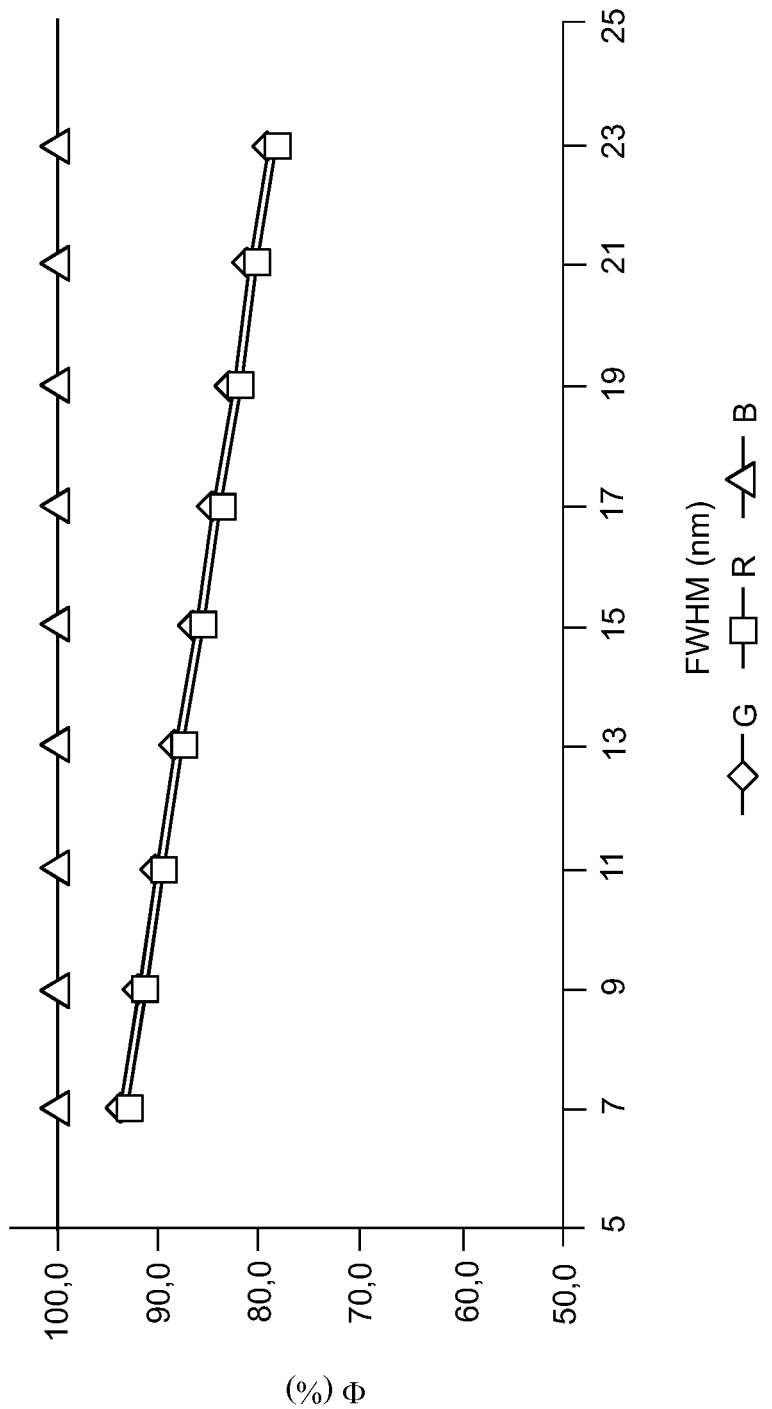
FIG. 11 shows the influence of the filter width of a band-stop filter on the respective luminous flux of the individual color channels.
Figure 12:
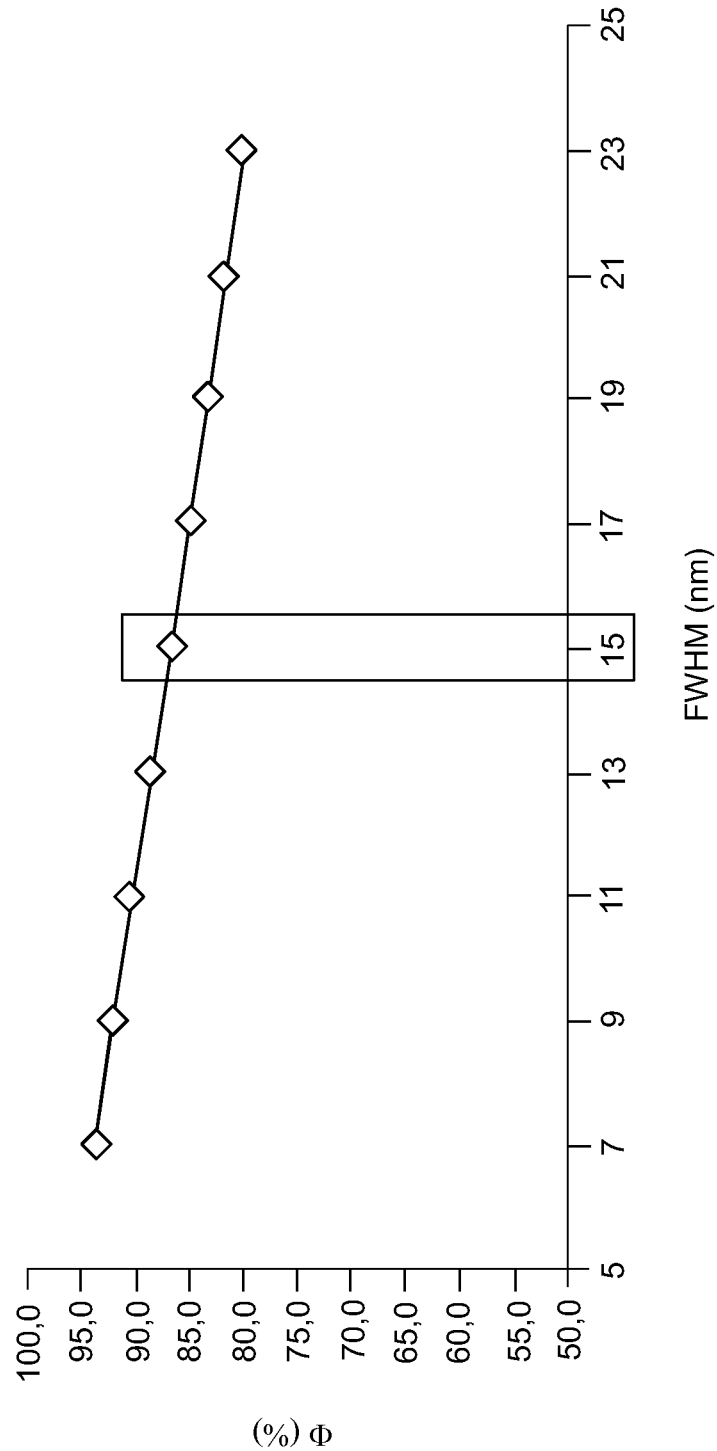
FIG. 12 shows the influence of the filter width of a band-stop filter on the total luminous flux.

FIG. 11 shows the influence of the filter width FWHM (X-axis) of a notch filter (peak wavelength $\lambda_F$=575 nm) on the respective luminous flux $\Phi$ in the individual color channels. As expected, the luminous flux of the green color channel G and of the red color channel R decreases as the filter width increases, whereas the blue color channel remains uninfluenced in the illustrated range. Consequently, the total luminous flux illustrated in FIG. 12 also exhibits the same behavior as the green color channel and red color channel. The marking again highlights the value for the notch filter used in FIG. 1.

To summarize, with the static notch filter 14 having a peak wavelength of 575 nm and a filter width of 15 nm FWHM, the following advantageous results are obtained:
  reduction of the dominant wavelength in the green color channel from 555.1 nm to 550.7 nm,
  increase in the dominant wavelength in the red color channel from 600.8 nm to 604.5 nm,
  increase in the addressable color space to 112.6%, which corresponds to 106.2% of the area of the Rec. 709 color space (without filter 94.3% of Rec. 709),
  increase in the color temperature from 6500 K to 7660 K.

The following disadvantages are acceptable in comparison therewith:
  reduction of the luminous flux in the green color channel to 87%,
  reduction of the luminous flux in the red color channel to 86%,
  reduction of the total luminous flux to 87%.

The exemplary embodiment explained above is based on three primary light colors, namely red, green and blue (RGB). However, the invention is not restricted to these three primary light colors. Rather, its advantageous effects are also obtained with more than three, for example four, primary light colors, in particular red, green, blue and yellow (RGBY). FIG. 13A shows the unfiltered and FIG. 13B shows the filtered emission spectrum of a yellow phosphor in schematic illustrations. A cerium-doped garnet phosphor is involved in this case. The Y-axis corresponds in each case to the spectral power density in arbitrary units. The wavelength in nanometers (nm) is plotted in each case on the X-axis. The notch filter used again has a filter width of 15 nm. The peak wavelength is adapted to 570 nm in order as far as possible to maintain the dominant wavelength $\lambda_{DY}$ of the yellow color channel as a result of the filtering. The dominant wavelength $\lambda_{DY}$ is 568.1 nm after the filtering, and 568.4 nm unfiltered. The luminous flux of the yellow color channel decreases to 82% as a result of the filtering (100% unfiltered).

As the above results show, with the aid of some measurements it is possible to design and provide a band-stop filter suitable for the respective target predefinition.

Numerous modifications are possible for the lighting device illustrated schematically in FIG. 1, without departing from the scope of protection of the invention. By way of example, the phosphor wheel can also be operated in the transmission mode, instead of in the reflection mode. Correspondingly, the band-stop filter can also be designed in reflection instead of—as shown—in transmission. Moreover, e.g. the dichroic mirror can also be designed to be transmissive for the excitation radiation and reflective for the converted light, in which case it is merely necessary to interchange the positions of excitation radiation source and optical output or integrator. Furthermore, the notch filter can be arranged between the phosphor wheel and the dichroic mirror or downstream of the dichroic mirror in the conversion light path.

The invention proposes a lighting device comprising a wavelength conversion arrangement and a static band-stop filter. The wavelength conversion arrangement comprises two wavelength conversion elements, which can be excited to emit conversion light by means of excitation radiation emitted by an excitation source. In order to increase the color space which is addressable by means of the two wavelength conversion elements, with the aid of the band-stop filter the shorter dominant wavelength of the conversion light of both wavelength conversion elements is shortened and the longer dominant wavelength is lengthened. For this purpose, the peak wavelength of the band-stop filter is chosen such that it lies between the two dominant wavelengths of the conversion light emitted by the two wavelength conversion elements. The use of a static band-stop filter designed in this way makes it possible to dispense with separate filter elements for each wavelength conversion element. If the wavelength conversion arrangement is designed as a phosphor wheel, in particular a separate filter wheel to be synchronized with the phosphor wheel can be dispensed with.

The invention claimed is:

1. A lighting device for generating light by means of wavelength conversion arrangement, comprising:
  an excitation radiation source, which is designed to emit excitation radiation, and a wavelength conversion arrangement, which comprises at least one first wavelength conversion element and one second wavelength conversion element, which wavelength conversion arrangement is arranged in such a way that excitation radiation emitted by the excitation radiation source can be radiated at least indirectly onto the first wavelength conversion element and onto the second wavelength conversion element,
  wherein the first wavelength conversion element is designed to convert excitation radiation into light having a first spectrum and a first dominant wavelength, and
  wherein the second wavelength conversion element is designed to convert excitation radiation into light having a second spectrum and a second dominant wavelength, wherein the second dominant wavelength is longer than the first dominant wavelength,
  characterized in that
  the lighting device furthermore comprises at least one band-stop filter arranged in such a way that light emitted by the first wavelength conversion element and the second wavelength conversion element can be radiated at least partly and at least indirectly onto the band-stop filter,
  wherein the band-stop filter is designed to filter the light emitted by the wavelength conversion elements and radiated onto the band-stop filter in such a way that the first dominant wavelength is shortened and the second dominant wavelength is lengthened.

2. The lighting device as claimed in claim 1, wherein the first wavelength conversion element is designed in such a way that the first dominant wavelength is in a green or yellow-green spectral range.

3. The lighting device as claimed in claim 1, wherein the second wavelength conversion element is designed in such a way that the second dominant wavelength is in a red or yellow-red spectral range.

4. The lighting device as claimed in claim 1, wherein the band-stop filter is designed in such a way that it blocks a yellow spectral range.

5. The lighting device as claimed in claim 1, wherein the band-stop filter has a peak wavelength in the range of between 555 and 605 nm, in particular between 565 and 585 nm.

6. The lighting device as claimed in claim 1, wherein the band-stop filter has an FWHM filter width in the range of between 5 and 25 nm, in particular between 10 and 20 nm.

7. The lighting device as claimed in claim 1, wherein the band-stop filter is designed as a static filter.

8. The lighting device as claimed in claim 1, wherein the wavelength conversion arrangement is designed as a phosphor wheel, which is rotatable about a rotation axis of the phosphor wheel, wherein the first wavelength conversion element is arranged at least in a segment of a ring-shaped region of the phosphor wheel running around the rotation axis of the phosphor wheel, and wherein the second wavelength conversion element is arranged at least in a second segment of the or a further region running in a ring-shaped fashion around the rotation axis of phosphor wheel.

9. The light device as claimed in claim 8, wherein the phosphor wheel has a region that is transmissive to excitation radiation in at least one third segment of or a further region running in a ring-shaped fashion around the rotation axis.

10. The lighting device as claimed in claim 8, wherein the lighting device is configured in such way that excitation radiation emitted by the excitation radiation source, at least indirectly, during a rotation of the phosphor wheel, can be radiated sequentially onto each segment of the region of the phosphor wheel running in a ring-shaped fashion around the rotation axis.

11. A method for generating light by means of a wavelength conversion arrangement, which comprises at least two wavelength conversion elements, comprising the following method steps:
providing a first wavelength conversion element, which, upon absorbing excitation radiation, converts the latter into light having a first spectrum and a first dominant wavelength,
providing a second wavelength conversion element, which, upon absorbing excitation radiation, converts the latter into light having a second spectrum and a second dominant wavelength, wherein the first dominant wavelength is shorter than the second dominant wavelength,
radiating excitation radiation onto the first wavelength conversion element, radiating excitation radiation onto the second wavelength conversion element, characterized by the following further method step:
providing a band-stop filter, which filters the light converted by the wavelength conversion elements in such a way that the first dominant wavelength is shortened and the second dominant wavelength is lengthened.

12. The method as claimed 11 comprising the following method step:
selecting the peak wavelength and the FWHM filter width of the band-stop filter in such a way that the band-stop filter reduces the dominant wavelength of the wavelength-converted light having the first spectrum and increases the dominant wavelength of the wavelength-converted light having the second spectrum.

13. The method as claimed in claim 12 comprising the following additional method step:
selecting the peak wavelength and the FWHM filter width of the band-stop filter in such a way that the band-stop filter reduces the total luminous flux of the wavelength-converted light having the first spectrum and of the wavelength-converted light having the second spectrum to not less than 75%, in particular not less than 80%.

14. The method as claimed in claim 12 comprising the following additional method step:
selecting the peak wavelength of the band-stop filter in such a way that the band-stop filter increases the color temperature of the mixed light, which is mixed from the wavelength-converted light having the first spectrum and the wavelength-converted light having the second spectrum and, if appropriate, one or more further colored light portions, in relation to the unfiltered mixed light.

15. A lighting device for generating light by means of wavelength conversion arrangement, comprising:
an excitation radiation source, which is designed to emit excitation radiation, and a wavelength conversion arrangement, which comprises at least one first wavelength conversion element and one second wavelength conversion element, which wavelength conversion arrangement is arranged in such a way that excitation radiation emitted by the excitation radiation source can be radiated at least indirectly onto the first wavelength conversion element and onto the second wavelength conversion element,
wherein the first wavelength conversion element is designed to convert excitation radiation into light having a first spectrum and a first dominant wavelength,
wherein the first wavelength conversion element is designed in such a way that the first dominant wavelength is in a green or yellow-green spectral range, and
wherein the second wavelength conversion element is designed to convert excitation radiation into light having a second spectrum and a second dominant wavelength, wherein the second dominant wavelength is longer than the first dominant wavelength,
wherein the second wavelength conversion element is designed in such a way that the second dominant wavelength is in a red or yellow-red spectral range,
characterized in that
the lighting device furthermore comprises at least one band-stop filter arranged in such a way that light emitted by the first wavelength conversion element and the second wavelength conversion element can be radiated at least partly and at least indirectly onto the band-stop filter,
wherein the band-stop filter is designed to filter the light emitted by the wavelength conversion elements and radiated onto the band-stop filter in such a way that the first dominant wavelength is shortened and the second dominant wavelength is lengthened.

16. The lighting device as claimed in claim 15, wherein the band-stop filter is designed in such a way that it blocks a yellow spectral range.

17. The lighting device as claimed in claim 15, wherein the band-stop filter has a peak wavelength in the range of between 555 and 605 nm, in particular between 565 and 585 nm.

18. The lighting device as claimed in claim 15, wherein the band-stop filter has an FWHM filter width in the range of between 5 and 25 nm, in particular between 10 and 20 nm.

19. The lighting device as claimed in claim 15, wherein the band-stop filter is designed as a static filter.

20. The lighting device as claimed in claim 15, wherein the wavelength conversion arrangement is designed as a phosphor wheel, which is rotatable about a rotation axis of the phosphor wheel, wherein the first wavelength conversion element is arranged at least in a segment of a ring-shaped region of the phosphor wheel running around the rotation axis of the phosphor wheel, and wherein the second wavelength conversion element is arranged at least in a second segment of the or a further region running in a ring-shaped fashion around the rotation axis of phosphor wheel.

* * * * *

UNITED STATES PATENT AND TRADEMARK OFFICE
CERTIFICATE OF CORRECTION

| | | |
|---|---|---|
| PATENT NO. | : 9,885,864 B2 | Page 1 of 1 |
| APPLICATION NO. | : 14/529225 | |
| DATED | : February 6, 2018 | |
| INVENTOR(S) | : Oliver Mehl | |

It is certified that error appears in the above-identified patent and that said Letters Patent is hereby corrected as shown below:

In the Specification

Column 7, Line 12: Please insert --22-- between the words "trough-opening" and "is intended"

In the Claims

Column 11, Line 20: Please delete "The light device" and write as follows: "The lighting device"

Column 11, Line 54: Please delete "The method as claimed 11" and write as follows: "The method as claimed in claim 11"

Signed and Sealed this
Seventeenth Day of July, 2018

Andrei Iancu
*Director of the United States Patent and Trademark Office*